(12) United States Patent
Tanner

(10) Patent No.: US 8,113,067 B2
(45) Date of Patent: Feb. 14, 2012

(54) PIPETTE

(75) Inventor: Max Tanner, Flurlingen (CH)

(73) Assignee: TPP Techno Plastic Products AG, Trasadingen (CH)

( * ) Notice: Subject to any disclaimer, the term of this patent is extended or adjusted under 35 U.S.C. 154(b) by 804 days.

(21) Appl. No.: 12/086,703

(22) PCT Filed: Dec. 18, 2006

(86) PCT No.: PCT/CH2006/000706
§ 371 (c)(1),
(2), (4) Date: Sep. 15, 2008

(87) PCT Pub. No.: WO2007/071088
PCT Pub. Date: Jun. 28, 2007

(65) Prior Publication Data
US 2009/0158861 A1 Jun. 25, 2009

(30) Foreign Application Priority Data
Dec. 20, 2005 (CH) ..................... 2016/05

(51) Int. Cl.
*B01L 3/02* (2006.01)
*G01N 1/14* (2006.01)
*B29C 45/00* (2006.01)
*B29D 23/00* (2006.01)

(52) U.S. Cl. ........... 73/864.11; 156/244.13; 156/244.15; 264/328.1; 422/513

(58) Field of Classification Search ............. 29/428, 29/460, 527.3, 890.053, 890.14, DIG. 41; 73/864.01, 864.11, 864.14; 156/244.13, 156/244.15, 245; 219/59.1, 61; 264/232, 264/238, 328.1; 422/513, 920, 922, FOR. 108
See application file for complete search history.

(56) References Cited

U.S. PATENT DOCUMENTS

| | | | |
|---|---|---|---|
| 3,216,616 A | | 11/1965 | Blankenship, Jr. |
| 3,938,392 A | * | 2/1976 | Rodrigues ................. 73/864.11 |
| 4,212,204 A | * | 7/1980 | St. Amand ................. 73/864.11 |
| 4,728,501 A | * | 3/1988 | Atake ............................ 422/509 |
| 4,999,164 A | * | 3/1991 | Puchinger et al. ............ 422/513 |
| 5,260,030 A | * | 11/1993 | DeVaughn ............. 73/864.11 X |

(Continued)

FOREIGN PATENT DOCUMENTS

| | | |
|---|---|---|
| EP | 0 182 943 A1 | 6/1986 |
| EP | 0 269 345 B1 | 9/1992 |
| GB | 2 164 585 A | 3/1986 |
| WO | WO 9320440 A1 * | 10/1993 |

*Primary Examiner* — Thomas P Noland
(74) *Attorney, Agent, or Firm* — Birch, Stewart, Kolasch & Birch, LLP

(57) ABSTRACT

A pipette and a process for producing a pipette (10) with a capacity of from 1 to 50 ml from a thermoplastic polymer. An essentially cylindrical pipette shaft (12) with an internal diameter ($d_i$) and an essentially cylindrical cup-shaped pipette reservoir (16) with an internal diameter ($D_i$) are produced in an injection molding process. The pipette shaft (12) has, at one end, a pipette tip (14) which narrows to a suction/exit orifice (20), and, at the other end, a conical widening (18). The pipette reservoir (16) has a suction nozzle (24) abutting coaxially from the bottom of the pipette reservoir (16). The conical widening (18) is welded or adhesive-bonded at the end and coaxially to the pipette reservoir (16). The ratio of the total pipette length (L) to the arithmetic mean of the internal diameters ($d_i$ and $D_i$) of the pipette shaft (12) and of the pipette reservoir (16) is at least 15. The pipette may have a suction nozzle (24) with a retainer, such as a radially inward jutting rib (34) for a cotton wool bud.

21 Claims, 2 Drawing Sheets

U.S. PATENT DOCUMENTS

| | | | |
|---|---|---|---|
| 5,563,356 A | 10/1996 | Mussi et al. | |
| 5,627,522 A * | 5/1997 | Walker et al. | 340/618 |
| 6,197,259 B1 * | 3/2001 | Kelly et al. | 73/864.01 X |
| 6,973,845 B2 * | 12/2005 | Bell | 73/864.14 |
| 2003/0156994 A1 * | 8/2003 | Mahler et al. | 422/525 |
| 2005/0155439 A1 * | 7/2005 | Belgardt | 73/864.01 |
| 2006/0127282 A1 * | 6/2006 | Yamashita et al. | 422/400 |
| 2008/0078258 A1 * | 4/2008 | Price et al. | 73/864.01 |
| 2009/0007703 A1 * | 1/2009 | Angus et al. | 73/864.14 |

\* cited by examiner

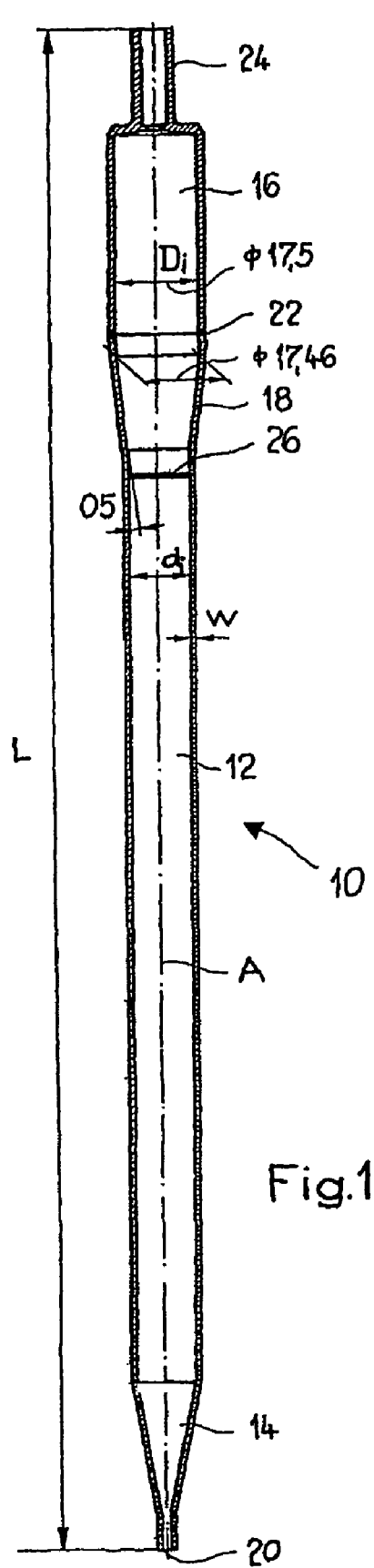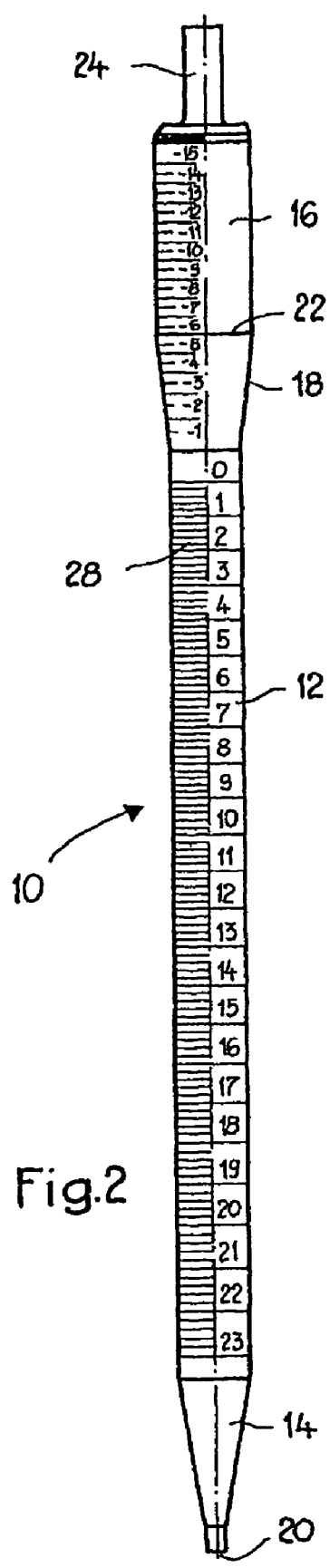

PIPETTE

TECHNICAL FIELD

The invention relates to a method for producing a pipette with a capacity of from 1 to 50 ml from a thermoplastic plastic. In addition, the invention relates to a plastics pipette, in particular with a capacity ranging from 1 to 50 ml, having a substantially cylindrical pipette shaft which has an internal diameter and which has at one end a pipette tip tapering to a suction/discharge opening and at the other end a conical widening, and to a pipette reservoir of substantially cylindrical-cup-shaped configuration with an internal diameter corresponding to the widening, the widening being adjoined by a pipette reservoir, which has a suction nozzle projecting coaxially from a bottom of the pipette reservoir.

PRIOR ART

A pipette is used to suck up liquids, it comprises a pipette tip which is applied coaxially to a cylinder-tube-shaped pipette shaft. The widespread practice of sucking up with the mouth can be problematical where toxic, biologically active, radioactive or otherwise hazardous liquids are involved. The suction is therefore generally carried out with a suction aid, for example an elastically deformable balloon, which is compressed and, when released, re-expands and thus creates an underpressure. Several types of pipettes are known, which are also equipped according to relevant DIN specifications. A traditional volumetric pipette comprises a relatively narrow shaft, with an expansion volume between the pipette tip and the suction opening. Volumetric pipettes have in the direction of the suction opening a marking calibrated to a specific volume. Capillary pipettes have a very narrow shaft without expansion volume, the internal diameter being so small that no tapered pipette tip is formed. Measuring pipettes have a pipette shaft with a larger diameter and have a scale applied to the outside.

Pipettes are used both as single pipettes and for multichannel pipettes, the latter in particular in larger pipetting devices.

The pipette tip can be formed in one piece with the pipette shaft, can be welded onto this or detachably connected thereto. The pipette tip must ensure that, in the transfer of liquids, none of the content of the pipette drips off.

The pipettes which were originally made of glass nowadays consist almost exclusively of a thermoplastic plastic. The smaller pipettes with a capacity of from 1 to 50 ml, which are here solely of interest, are generally produced by extrusion of the pipette shaft, in that a substantially cylindrically extruded tube is cut to length and a pipette tip is applied.

REPRESENTATION OF THE INVENTION

The inventor has set himself the task of creating a method for producing a pipette of the type stated in the introduction, which, in mass production, allows a higher work rate combined with exactly the same precision.

The object is achieved according to the invention by the fact that a substantially cylindrical pipette shaft with an internal diameter, which at one end has a pipette tip tapering to a suction/discharge opening and at the other end a conical widening, and a pipette reservoir of substantially cylindrical-cup-shaped configuration with an internal diameter corresponding to the widening, which pipette reservoir has a suction nozzle projecting coaxially from the bottom of the pipette reservoir, are produced by injection molding, and the conical widening is welded or bonded, on the end face and coaxially, to the pipette reservoir, the ratio of the total pipette length to the arithmetic mean of the internal diameters of the pipette shaft and pipette reservoir amounting to at least 15.

Surprisingly, substantially cylinder-tube-shaped pipettes, with a capacity of from to 50 ml, without expansion volume in the longitudinal center region, were successfully produced by injection molding. The liquefied thermoplastic plastic is injected under high pressure into a high-precision mold, solidifies there and is removed again from the mould. This method allows a high, hitherto impossible work rate for the production of small pipettes, irrespective of whether individually or in series with a number of pipettes per work cycle. The success is surprising, since experts have regarded the production of smaller, 1 to 50 ml capacity pipettes by extrusion as the single technical feasible option.

The pipettes produced with the method according to the invention preferably have a ratio of length to internal diameter of from 15 to 65. The produced standard measurements approximate to a constant length of all pipettes of about 340 mm and an internal diameter of from 10 to 22 mm.

The method for the injection molding of thermoplastic plastics allows the pipette tip to be injected simultaneously with the pipette shaft.

Of course, the pipette shaft and the pipette tip can also be made in separate injection molding processes and can be welded or bonded together directly or ex warehouse. The annular joint must be leak-tight and stable.

Irrespective of the production method, the quality of the pipette tip can be improved by the application of a hydrophobic, i.e. water-repellant coating. If the pipette is dipped into a liquid, this liquid, when the pipette is withdrawn, can adhere less to the outer side of the pipette tip and drip off.

The pipette shaft is configured on the side opposite to the pipette tip such that it widens in the shape of a cone. To this end face, as mentioned, there is coaxially connected, in particular by welding or bonding, a substantially cylindrical pipette reservoir. This cylindrical pipette reservoir has an internal diameter which is enlarged in accordance with the widening. The ratio of the internal diameter of the pipette reservoir to the internal diameter of the pipette shaft expediently lies within the range from 1.2 to 2, in particular in the region of about 1.5.

The thermoplastic plastic which is used for the injection molding is, for example, polyethylene, polypropylene or polystyrene.

On the pipette shaft, after it has been joined together with the pipette reservoir, at least one, preferably calibrated marking or a scale is applied, in particular by stamping or printing.

In practice, the pipette is filled beyond the marking or beyond the intended scale position and then adjusted to the respectively desired volume by metered actuation of an air vent of the meniscus of the liquid which is to be pipetted.

TABLE 1

Pipettes made of injection-molded polystyrene

| Pipette capacity | Pipette Length (L) | Mean internal diameter $[(d_i + D_i)/2]$ | Ratio $[L/d_i]$ |
|---|---|---|---|
| 50 ml | 340 mm | 17.0 mm | 17.9 |
| 25 ml | 340 mm | 14.8 mm | 23.0 |
| 10 ml | 340 mm | 7.5 mm | 45.3 |
| 5 ml | 340 mm | 5.5 mm | 64.8 |

A plastics pipette produced according to the method according to the invention is characterized in that the pipette shaft and the pipette piece are produced in one piece by injection molding, the ratio of the total pipette length to the arithmetic mean of the internal diameter of the pipette shaft and pipette reservoir amounting to at least 15. There are therefore no weld seams or the like between said pipette parts.

Preferably, the suction nozzle is provided with a retaining means for a filter. The retaining means ensures that the filter (for example a cotton wool wad) inserted from behind into the suction nozzle can be comfortably and rapidly placed at the desired location and does not accidentally jut into the pipette reservoir or into the safety region defined by the marking.

The retaining means is preferably a cross-sectional narrowing of the suction nozzle. It may be, for example, a rib configured on the inner wall or an inserted perforated cap or a web. It may also, however, be a rubber lining or something similar. Although it is advantageous if the retaining means is a barrier, which makes it impossible to push the filter past the retaining means, it may also be sufficient if, by the retaining means, a resistance is formed which, when the filter is inserted, generates a detectable resistance for the user.

The retaining means can also be used irrespective of the pipette shape with reservoir and irrespective of a specific production method of the pipette produced by injection molding, i.e. including in pipettes produced according to another method.

BRIEF DESCRIPTION OF THE DRAWINGS

The invention is explained in greater detail with reference to illustrative embodiments represented in the drawing, which are also the subject of dependent patent claims, wherein, in diagrammatic representation:

FIG. 1 shows a pipette with a marking, produced by injection molding,

FIG. 2 shows a pipette according to FIG. 1 with a scale,

As a matter of principle, the same parts are provided in the figures with the same reference symbols.

WAYS TO IMPLEMENT THE INVENTION

Figure 3:
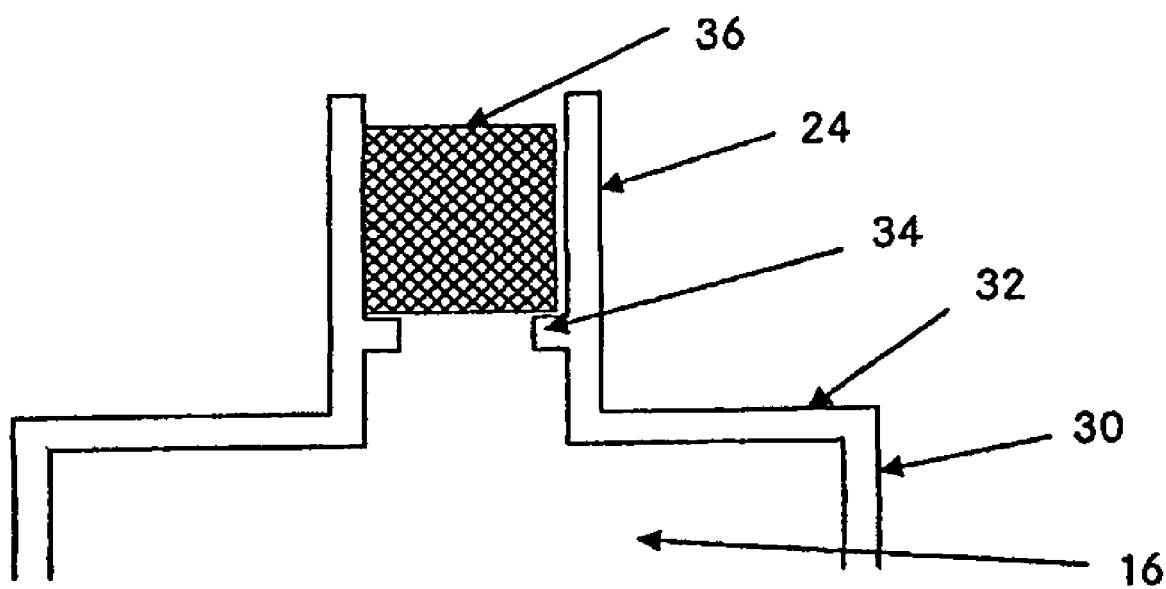
FIG. 3 shows a diagrammatic representation of a retaining means in the longitudinal section of the pipette longitudinal axis.

A polystyrene pipette 10 represented in axial section in FIG. 1 essentially comprises a pipette shaft 12 having a molded-on pipette tip 14 and a pipette reservoir 16 welded onto the widened pipette shaft 12. All pipette parts 12, 14, 16 are arranged coaxially relative to a longitudinal axis A, the wall thickness w of all pipettes 12, 14, 16 measuring about 1 mm.

The pipette shaft 12 and the pipette tip 14 together have a length of about 250 mm. In the transition to the conical widening 18, the internal diameter measures $d_i$=12.86 mm, in the transition region to the pipette tip 14, on the other hand, only 11.38 mm. By virtue of this taper at an angle of about 0.2°, the injection-molded part, the pipette 10, can be discarded without difficulty. The pipette tip 14, which is tapered over a length of about 30 mm at an angle of 8 to 10°, still has a constant internal diameter of 2.75 mm in a discharge region of about 5 mm length. This small suction/discharge opening 20 ensures a drip-free removal of the pipetted-off liquid.

The pipette reservoir 16 connected to the widening 18 of the pipette shaft 12 has an internal diameter $D_i$=17.5 mm. The annular weld seam 22 must be absolutely leak-tight and permanent. At the other end-face end, the pipette reservoir 16 has a coaxial suction nozzle 24. The total length L of the pipette 10 measures about 340 mm.

The pipette shaft 12 has in the upper region a marking 26. This serves to mark that volume range which the user, for safety reasons, should not use, or to indicate a limit which the user, when filling the pipette, should not exceed. At the typically demanded high working speeds in the use of the pipette, for example in the laboratory, it can easily happen that suction is aborted too late and that a filter (for example, cotton wool wad) present in the suction nozzle is wetted. The marking thus defines a safety zone easily visible to the user.

A pipette 10, corresponding essentially to FIG. 1 and represented in FIG. 2 in elevation, has two scales, marked in the region of the pipette shaft 12 with 0 to 23 ml, in the region of the conical widening 18 and pipette reservoir 16 with −1 to −15 ml. The pipette 10 according to FIG. 2 is also referred to as a burette.

FIG. 3 shows an axial longitudinal section of the rear end of the pipette 10. The cylindrical wall 30 of the pipette reservoir 16 is adjoined by a cap part 32 standing perpendicular to the pipette longitudinal axis. This forms the transition to the suction nozzle 24. According to a preferred embodiment of the invention, on the inner wall of the suction nozzle 24 there is provided a radially inward jutting rib 34. This forms a narrowing of the internal diameter of the suction nozzle 24. A cotton wool wad 36, which is pushed from behind into the suction nozzle 24, cannot, because of the rib 34, be accidentally pushed into the region of the pipette reservoir 16.

The rib 34 preferably runs around the whole of the inner circumference. It can also, however, be interrupted. In place of a circumferential rib, one or more knobs, for example, can be provided.

At least one web extending through the free cross section of the suction nozzle may also be provided. Also conceivable is a superficial rubber lining on the inner side of the wall, which, in comparison to the non-rubber-lined portion, generates a higher friction between the cotton wool wad and the inner wall.

In summary it can be stated that, as a result of the invention, a pipette has been created which is economically efficient to produce and which also offers benefits to the user in terms of handling.

The invention claimed is:

1. A method for producing a pipette with a capacity of from 1 to 50 ml from a thermoplastic plastic, comprising
   a substantially cylindrical pipette shaft with an internal diameter ($d_i$), which at one end is connected to a pipette tip tapering to a suction/discharge opening and at the other end to a conical widening, and a pipette reservoir of substantially cylindrical-cup-shaped configuration with an internal diameter ($D_i$) corresponding to the widening, which pipette reservoir has a suction nozzle projecting coaxially with respect to a central longitudinal axis of the substantially cylindrical pipette shaft from a cap at a top of the pipette reservoir, are produced by injection molding, and the conical widening is welded or bonded, on an end face opposite to the end of the conical widening connected to the substantially cylindrical pipette shaft and coaxially, to the pipette reservoir, the ratio of the total pipette length (L) to the arithmetic mean of the internal diameters ($d_i$ and $D_i$) of the pipette shaft and of the pipette reservoir amounting to at least 15.

2. The method as claimed in claim 1, wherein the pipette is produced in a ratio of length (L) to mean internal diameter [$(d_i+D_i)/2$] of from 15 to 65.

3. The method as claimed in claim 2, wherein the pipette tip is produced in one piece with the pipette shall.

4. The method as claimed in claim 2, wherein a prefabricated pipette tip that has a shape corresponding to that of the pipette shaft is applied coaxially to the pipette shaft by welding or bonding.

5. The method as claimed in claim 2, wherein a hydrophobic coating is applied to the pipette tip.

6. The method as claimed in claim 1, wherein the pipette tip is produced in one piece with the pipette shaft.

7. The method as claimed in claim 6, wherein a prefabricated pipette tip that has a shape corresponding to that of the pipette shaft is applied coaxially to the pipette shaft by welding or bonding.

8. The method as claimed in claim 6, wherein a hydrophobic coating is applied to the pipette tip.

9. The method as claimed in claim 1, wherein a prefabricated pipette tip that has a shape corresponding to that of the pipette shaft is applied coaxially to the pipette shaft by welding or bonding.

10. The method as claimed in claim 9, wherein a hydrophobic coating is applied to the pipette tip.

11. The method as claimed in claim 1, wherein a hydrophobic coating is applied to the pipette tip.

12. The method as claimed in claim 1, wherein the pipette shaft, on the end face opposite to the pipette tip, is configured such that it widens in the shape of a cone, and to this end face there is coaxially welded or bonded the substantially cylindrical pipette reservoir with an enlarged internal diameter ($D_i$).

13. The method as claimed in claim 12, wherein the pipette is produced having a ratio of the internal diameter ($D_i$) of the pipette reservoir to the internal diameter ($d_i$) of the pipette shaft of from 1.2 to 2.

14. The method as claimed in claim 12, wherein the coaxial suction nozzle is cylindrical and molded onto the pipette reservoir.

15. The method as claimed in claim 12, wherein a pipette is produced having a ratio of the internal diameter ($D_i$) of the pipette reservoir to the internal diameter ($d_i$) of the pipette shaft of about 1.5.

16. The method as claimed in claim 1, wherein, for the formation of the pipette, liquefied polystyrene, polyethylene or polypropylene is injection molded.

17. The method as claimed in claim 1, wherein, on an outer casing of the pipette shaft and/or of the pipette reservoir, a marking or a scale is impressed or imprinted.

18. A plastics pipette with a capacity ranging from 1 to 50 ml having a substantially cylindrical pipette shaft which has an internal diameter ($d_i$) and which is connected at one end to a pipette tip tapering to a suction/discharge opening and at the other end to a conical widening, and a pipette reservoir of substantially cylindrical-cup-shaped configuration with an internal diameter ($D_i$) corresponding to the widening, the widening being adjoined by a pipette reservoir, which has a suction nozzle projecting coaxially with respect to a central longitudinal axis of the substantially cylindrical pipette shaft from a cap at a top of the pipette reservoir, wherein the pipette shaft and the pipette tip are produced in one piece by injection molding, the ratio of the total pipette length (L) to the arithmetic mean of the internal diameters ($d_i$ and $D_i$) of the pipette shaft and of the pipette reservoir amounting to at least 15.

19. The pipette as claimed in claim 18, wherein the conical widening is welded or bonded, on an end face opposite to the end of the conical widening connected to the substantially cylindrical pipette shaft and coaxially, to the pipette reservoir.

20. The pipette as claimed in claim 18, wherein the suction nozzle is provided with a retaining means for a cotton wool wad.

21. The pipette as claimed in claim 20, wherein the retaining means is a narrowing of the internal cross section configured in the suction nozzle in the form of a rib.

* * * * *